United States Patent
Singh et al.

(12) 
(10) Patent No.: US 11,954,554 B1
(45) Date of Patent: Apr. 9, 2024

(54) METHODS AND SYSTEMS FOR MONITORING WEIGHT LOSS FROM CASKS STORING FLUID

(71) Applicant: DT Whisky Solutions, Inc., Fort Worth, TX (US)

(72) Inventors: Amrit Singh, Uttar Pradesh (IN); Shawn B. Smith, Fort Worth, TX (US); Nagendra Palle, Danville, CA (US)

(73) Assignee: DT Whisky Solutions, Inc., Fort Worth, TX (US)

( * ) Notice: Subject to any disclaimer, the term of this patent is extended or adjusted under 35 U.S.C. 154(b) by 0 days.

(21) Appl. No.: 17/832,629

(22) Filed: Jun. 4, 2022

(51) Int. Cl.
 *G06K 7/10* (2006.01)
(52) U.S. Cl.
 CPC .............. *G06K 7/10366* (2013.01)
(58) Field of Classification Search
 CPC ........ G06K 7/10366; G01F 23/26; C12H 1/22
 USPC ....................................................... 235/385
 See application file for complete search history.

(56) References Cited

U.S. PATENT DOCUMENTS

| | | | | |
|---|---|---|---|---|
| 10,889,787 | B2 * | 1/2021 | Fearnside | ............... C12G 3/07 |
| 2006/0113369 | A1 * | 6/2006 | Taylor | ............... G06K 7/10336 |
| | | | | 235/375 |
| 2015/0253174 | A1 * | 9/2015 | Barrett | ............... G01F 23/0007 |
| | | | | 73/304 C |
| 2021/0253340 | A1 * | 8/2021 | Nall | ..................... B65D 88/121 |

* cited by examiner

*Primary Examiner* — Ahshik Kim
(74) *Attorney, Agent, or Firm* — Spano Law Group; Joseph S. Spano

(57) ABSTRACT

Methods and systems for identifying and accurately monitoring evaporation from casks storing high value liquor are presented herein. A Cask Identification and Evaporation Monitoring (CIEM) system includes instrumentation to identify cask location within a high volume storage facility and monitor loss of content from each cask. The resulting data is communicated to a CIEM tracking server for storage and further analysis. The CIEM tracking server identifies excessive short term losses, e.g., leaks, arising anywhere in the storage facility. In addition, the CIEM tracking server identifies long term loss trends. The long term loss trends are enable data-driven management of the cask conditioning process, including tasks such as scheduling of cask rotation within the storage facility, bottling, etc.

20 Claims, 5 Drawing Sheets

METHODS AND SYSTEMS FOR MONITORING WEIGHT LOSS FROM CASKS STORING FLUID

TECHNICAL FIELD

The described embodiments relate to automated monitoring of weight loss from casks storing fluid.

BACKGROUND INFORMATION

High value liquors are often stored in wooden casks for long periods of time as part of a maturation process that can take many years. In some examples, liquor is stored in a wooden cask for over thirty years. During the aging process, casks are usually stored in warehouses, often in large numbers. During storage, it is necessary to monitor the physical condition of the casks and the contents. However, due to the large numbers of casks in storage, it is not possible to visually monitor the casks at all times.

Due to the porosity of wooden casks, alcohol stored inside a wooden cask will vaporize and slowly escape containment. In some examples, liquor stored in a cask has up to 80% alcohol by volume (ABV) at the time of filling. Over time, alcohol evaporates from the cask as the liquor matures, reducing the percentage of ABV of the stored liquor. In some examples, the optimum moment to remove liquor from a wooden cask and transfer the contents to a non-porous container, e.g., a glass bottle, is when the alcohol content of the liquid stored in the wooden cask approaches 40% ABV. It is important to bottle the liquor before the alcohol content falls below 40% ABV. For example, Scottish law bars the sale of any liquor marketed as single cask Scotch whisky if the alcohol content is below 40% ABV. If the alcohol content of the whisky stored in a wooden cask falls below 40% ABV, it must be blended with Scotch whisky having a higher ABV. This blending greatly reduces the value of the whisky originally stored in a single cask.

In addition to the relatively slow escape of alcohol from wooden casks, structural degradation of wooden casks may lead to relatively rapid loss of content by direct leakage from the cask. Losses from leakage can be financially significant due to the relatively high value of aged liquors.

In a typical facility, cask ABV and total volume are measured manually at a desired interval, e.g., every 3 months, every 6 months, etc., and the results are recorded on paper. In some cases, the results are entered into a digital record, e.g., spreadsheet. Unfortunately, this process is labor intensive, expensive, and less frequent than desirable. In some examples, significant product losses accumulate between inspection intervals.

In general, improvements in the monitoring of high value liquors in high volume storage facilities are desired.

SUMMARY

Methods and systems for identifying and accurately monitoring evaporation from casks storing high value liquor are presented herein. A Cask Identification and Evaporation Monitoring (CIEM) system includes instrumentation to identify cask location within a high volume storage facility and monitor loss of content from each cask. The resulting data is communicated to a CIEM tracking server for storage and further analysis. The CIEM tracking server identifies excessive short term losses, e.g., leaks, arising anywhere in the storage facility. In addition, the CIEM tracking server identifies long term loss trends. The long term loss trends are enable data-driven management of the cask conditioning process, including tasks such as scheduling of cask rotation within the storage facility, bottling, etc.

In one aspect, a CIEM system includes one or more CIEM subsystems. Each CIEM subsystem includes a control module communicatively linked to a suite of sensors that monitor a particular cask. The suite of sensors includes at least one load cell and a Radio Frequency Identification (RFID) sensor. Optionally, the suite of sensors also includes an accelerometer, an alcohol vapor sensor, liquid level sensor, or any combination thereof.

In a further aspect, one or more load cells are employed to periodically measure some or all of the weight of a cask. In addition, a RFID reader is employed to periodically identify a RFID tag attached to a cask in close proximity to the RFID reader. In this manner, the identity of each cask being monitored for weight loss is tracked. Furthermore, the location of the RFID reader within a high volume storage facility is known. Thus, the location of any cask identified in close proximity to the RFID reader is also identified.

In a further aspect, an accelerometer is employed to measure the acceleration present at the interface of the support frame and the cask. In some embodiments, the accelerometer is a piezoelectric sensor that operates without an external power source. If the signal exceeds a predetermined threshold value, the signal generates an interrupt used to 'wake up' the controller from a minimal power mode. After a predetermined settling time elapses after receiving the interrupt, the controller triggers a weight measurement, an RFID measurement, an ABV measurement, or any combination thereof.

In a further aspect, an alcohol vapor sensor is employed to periodically measure the alcohol content of liquor stored in a cask. In this manner, the alcohol by volume (ABV) can be estimated based on the measured alcohol content and the measured weight of liquor stored in the cask.

In another aspect, a battery supplies electrical power to elements of a CIEM subsystem, such as the controllers, load cells, RFID readers, vapor sensors, etc.

In some embodiments, power is provided to a CIEM subsystem via a wired connection operating in accordance with a Power Over Ethernet (POE) protocol.

In another further aspect, a CIEM system includes one or more ethanol sensors located within a high volume storage facility employed to store casks of alcohol based beverages. The ethanol sensor generates signals indicative of the volatility of the environment within the high volume storage facility. In some examples, the CIEM tracking server generates an alert to a user of the CIEM system when the measured volatility exceeds one or more predetermined threshold values.

In another aspect, sensors of a CIEM subsystem are powered down between measurement instances to minimize power consumption by the CIEM subsystem.

In one example, the load cells are sampled every hour. In some other examples, the sampling rate is adjusted to change the frequency of measurement in response to detection of a potential leakage event. In one example, if the rate of change of measured weight exceeds a threshold value, it may indicate leakage from a cask. In these examples, a CIEM tracking server communicates a command to a controller to increase the frequency of weight measurement to more closely monitor potential losses.

In another aspect, measured data received by a CIEM tracking server is analyzed to perform any number of tasks including, but not limited to providing alerts to a user indicating possible leakage from a specific cask, reporting long term evaporation trends from one or more casks, scheduling repositioning of casks within a long term storage facility, estimating cumulative evaporative losses from a specific cask, etc.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for identifying and accurately monitoring evaporation from casks storing high value liquor are presented herein. A Cask Identification and Evaporation Monitoring (CIEM) system includes instrumentation to identify cask location within a high volume storage facility and monitor loss of content from each cask. The resulting data is communicated to a CIEM tracking server for storage and further analysis. The CIEM tracking server identifies excessive short term losses, e.g., leaks, arising anywhere in the storage facility. In addition, the CIEM tracking server identifies long term loss trends. The long term loss trends are enable data-driven management of the cask conditioning process, including tasks such as scheduling of cask rotation within the storage facility, bottling, etc.

In one aspect, a CIEM system includes one or more CIEM subsystems. Each CIEM subsystem includes a control module communicatively linked to a suite of sensors that monitor a particular cask. The suite of sensors includes at least one load cell and a Radio Frequency Identification (RFID) sensor. Optionally, the suite of sensors also includes an accelerometer, an alcohol vapor sensor, liquid level sensor, or any combination thereof.

Figure 1:
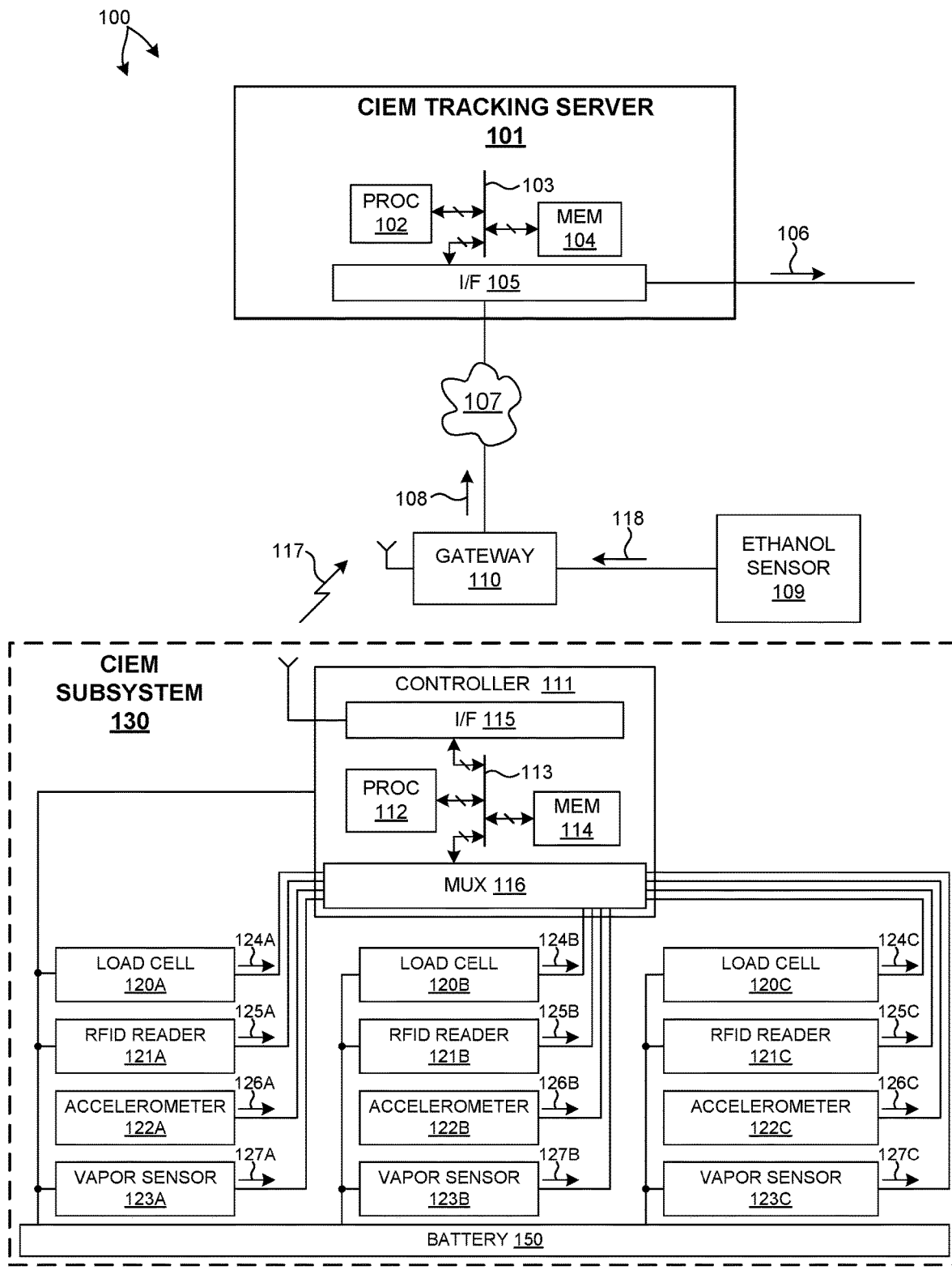
FIG. 1 is a simplified diagram illustrative of Cask Identification and Evaporation Monitoring (CIEM) system 100 in one embodiment.

FIG. 1 is a diagram illustrative of a CIEM system 100 in one embodiment. As depicted in FIG. 1, CIEM subsystem 130 is communicatively linked to CIEM tracking server 101 via communications gateway 110. In general, any number of CIEM subsystems may be communicatively linked to CIEM tracking server 101 via communications gateway 110 or another communications gateway in a manner analogous to the embodiment described with reference to FIG. 1.

As depicted in FIG. 1, CIEM subsystem 130 includes controller 111, three sets of sensors 120A-123A, 120B-123B, and 120C-123C, and battery 150. Each set of sensor includes a load cell, e.g., load cells 120A-C, a RFID reader, e.g., RFID readers 121A-C, an accelerometer, e.g., accelerometers 122A-C, and an alcohol vapor sensor, e.g., alcohol vapor sensors 123A-C. Each set of sensors is employed to monitor a corresponding cask. In general, a CIEM subsystem may include any number of sets of sensors to monitor any number of corresponding casks. In some embodiments, up to four casks are simultaneously monitored by a CIEM subsystem.

As depicted in FIG. 1, controller 111 includes a processor 112 and memory 114. Processor 112 and memory 114 communicate over bus 113. Memory 114 includes an amount of memory that stores cask monitoring information. Memory 114 also includes an amount of memory that stores program code that, when executed by processor 112, causes processor 112 to implement cask monitoring functionality as described herein. Controller 111 also includes a multiplexer 116 to interface with incoming data from any of the suite of sensors employed to monitor each cask. In addition, controller 111 includes communications interface 115 that communicatively links controller 111 to gateway 110.

Controller 111 is communicatively coupled to each sensor via a wired or wireless communications interface. In some embodiments, controller 111 is communicatively linked to each sensor by a universal serial bus (USB) interface. In other embodiments, controller 111 is communicatively linked to each sensor by any of an I2C interface, serial peripheral interface (SPI) interface, universal asynchronous receiver-transmitter (UART) interface, etc. In some embodiments a dedicated, encrypted wired communication link (e.g., a wired communication link adhering to the RS-485 standard) is employed to communicatively link controller 111 and each sensor. In some embodiments a dedicated wireless communication bridge (e.g., a wireless communication link adhering to the IEEE 802.11 protocol) is employed to communicatively link controller 111 and each sensor.

Figure 2:
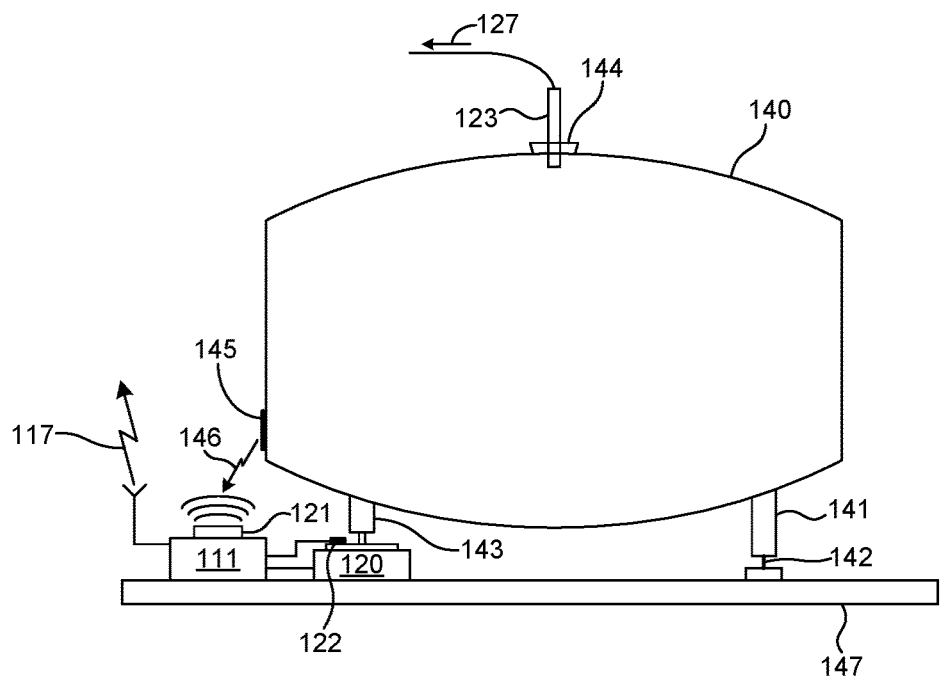
FIG. 2 is a diagram illustrative of a side view of a cask supported on a support frame.
Figure 3:
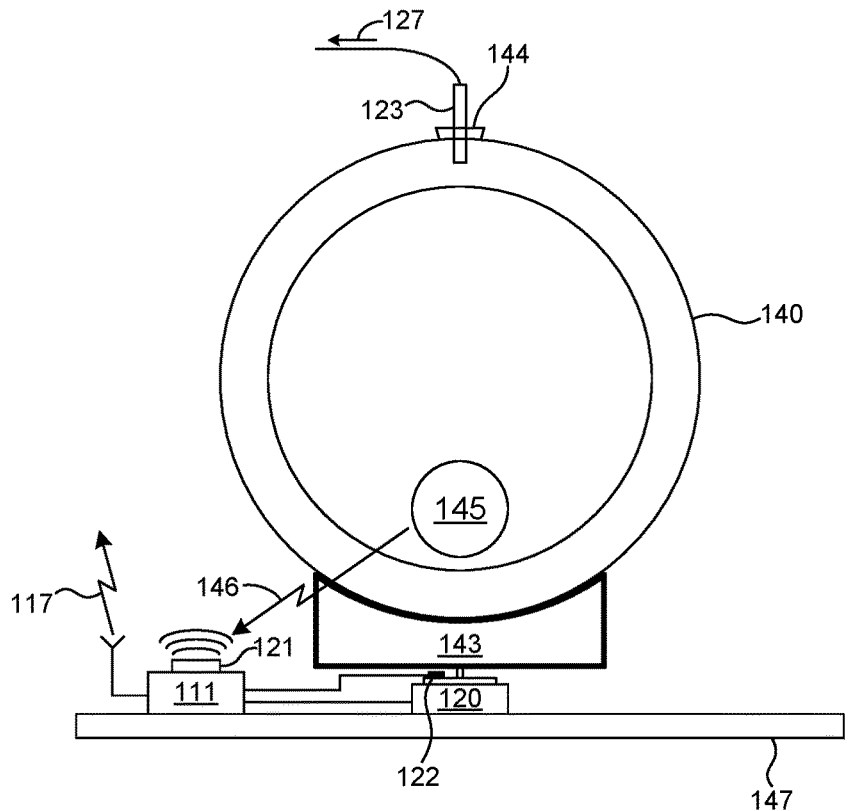
FIG. 3 is a diagram illustrative of an end view of a cask supported on a support frame.
Figure 4:
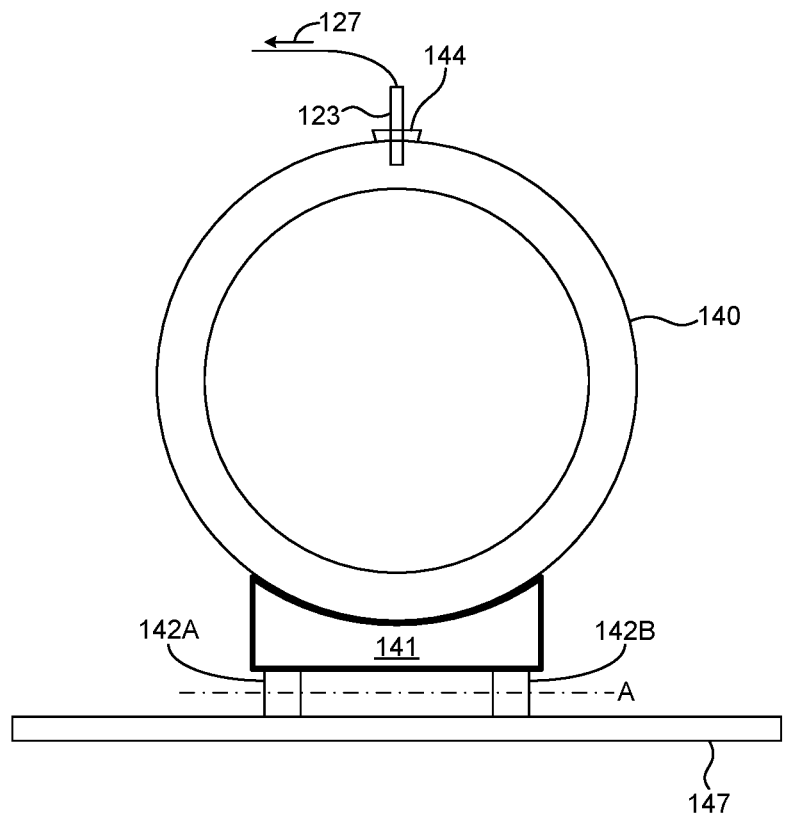
FIG. 4 is a diagram illustrative of an end view of a cask opposite the end view depicted in FIG. 3.

FIG. 2 depicts an illustration of a side view of a cask 140 supported on a frame 147 by saddles 141 and 143. FIG. 3 depicts an illustration of an end view of cask 140 supported by frame 147. FIG. 4 depicts an illustration of an end view of cask 140 opposite the end view depicted in FIG. 3.

In a further aspect, one or more load cells are employed to periodically measure a portion of the weight of a cask. In some embodiments, a load cell is configured to support the entire weight of a cask. In these embodiments, the weight measured by the load cell captures the entire weight of the cask and is directly indicative of the weight of the cask. In some other embodiments, a load cell is configured to support a repeatable fraction of the entire weight of a cask. In these embodiments, the weight measured by the load cell captures the fraction of the weight of the cask and is indirectly indicative of the weight of the cask.

As depicted in FIG. 2, cask 140 is supported on a frame 147 by saddles 141 and 143. As depicted in FIGS. 2 and 3, load cell 120 supports saddle 143, and thus measures the weight carried by saddle 143. The fraction of the total weight of cask 140 supported by saddle 143 is constant as long as cask 140 remains in the same position with respect to saddles 141 and 143. Thus, the force measured by load cell 120 is indicative of the total weight of cask 140, and changes in static load measured by load cell 120 are indicative of changes in the total weight of cask 140.

As depicted in FIGS. 2-4, saddles 141 and 143 are shaped to support cask 140 over a large area. In some embodiments, saddle 141 is directly coupled to frame 147. In other embodiments, such as the embodiment depicted in FIGS. 2 and 4, saddle 141 is coupled to elastic hinges 142A and 142B. Elastic hinges 142A and 142B rigidly couple saddle 141 to frame 147 in all degrees of freedom except in rotation about an axis, A, depicted in FIG. 4. This compliance in rotation minimizes hysteresis in the measurement of weight by load cell 120 due to frictional contact between cask 140 and saddle 141. In general, any number of elastic hinges may be employed to minimize hysteresis in the measurement of weight of cask 140 by load cell 120.

As depicted in FIG. 1, CIEM subsystem 130 includes load cells 120A-C, each communicatively coupled to controller 111. Load cells 120A-C communicate signals 124A-C, respectively, to controller 111. Signals 124A-C are indicative of the weight of a cask measured by load cells 120A-C, respectively.

In a further aspect, a RFID reader is employed to periodically identify a RFID tag attached to a cask in close proximity to the RFID reader. In this manner, the identity of each cask being monitored for weight loss is tracked. Furthermore, the location of the RFID reader within a high volume storage facility is known. Thus, the location of any cask identified in close proximity to the RFID reader is also identified. In this manner, the location of each identified cask within a storage facility is also tracked over time.

As depicted in FIG. 3, a RFID tag 145 is attached to the lid of cask 140 in close proximity to RFID reader 121. Cask 140 is always stored horizontally with fill hole 144 oriented upward. RFID tag 145 is located on the lid of cask 140 at the edge of the lid furthest from the top side of cask 140. In this manner, RFID tag 145 is located as close as possible to RFID reader 121 when cask 140 is placed on support frame 147.

RFID reader 121 identifies the RFID tag 145 at each measurement interval based on signals 146 received from RFID tag 145.

As depicted in FIG. 1, CIEM subsystem 130 includes RFID readers 121A-C, each communicatively coupled to controller 111. RFID readers 121A-C communicate signals 125A-C, respectively, to controller 111. Signals 125A-C are indicative of the identification a cask identified in close proximity to RFID readers 121A-C, respectively.

In a further aspect, an accelerometer is employed to measure the acceleration present at the interface of the support frame and the cask. As depicted in FIGS. 2 and 3, accelerometer 122 is located on the top surface of load cell 120, i.e., the portion of load cell 120 that move with saddle 143 and cask 140. In general, accelerometer 122 may be located on any structure that moves with cask 140 while cask 140 is in contact with the support frame 147. In some embodiments, accelerometer 122 is a piezoelectric sensor that operates without an external power source. Accelerometer 122 generates a signal in response to movement of the surface upon which the accelerometer is attached. The signal, e.g., any of signals 126A-C depicted in FIG. 1, is communicated to controller 111. If the signal exceeds a predetermined threshold value, the signal generates an interrupt that can be used to 'wake up' controller 111, load cell 120, RFID reader 120, and alcohol vapor sensor 123 from a minimal power mode. After a predetermined settling time elapses after receiving the interrupt, the controller triggers a weight measurement, an RFID measurement, an ABV measurement, or any combination thereof.

In this manner, accelerometer 122 is employed to detect when cask 140 is moved onto support frame 147, and triggers initial measurements of weight, cask identification, ABV, or any combination thereof.

In some embodiments, an accelerometer is not employed as part of a CIEM subsystem. In this sense, an accelerometer is optional.

As depicted in FIG. 1, CIEM subsystem 130 includes accelerometers 122A-C, each communicatively coupled to controller 111. Accelerometers 122A-C communicate signals 126A-C, respectively, to controller 111. Signals 126A-C are indicative of the movement of a cask supported by a structure to which the accelerometer is attached, respectively.

In a further aspect, an alcohol vapor sensor is employed to periodically measure the alcohol content of liquor stored in a cask. In this manner, the alcohol by volume (ABV) can be estimated based on the measured alcohol content and the measured weight of liquor stored in the cask. By periodically monitoring the ABV of the liquor stored in a particular cask using an alcohol vapor sensor, manual ABV checks can be eliminated or dramatically reduced in frequency.

FIGS. 2-4 depict an alcohol vapor sensor 123 integrated with a bung that closes fill hole 144 of cask 140. In this manner, the sensor is in physical contact with the air space within cask 140.

In some embodiments, an alcohol vapor sensor is not employed as part of a CIEM subsystem. In this sense, an alcohol vapor sensor is optional.

As depicted in FIG. 1, CIEM subsystem 130 includes alcohol vapor sensors 123A-C, each communicatively coupled to controller 111. Alcohol vapor sensors 123A-C communicate signals 127A-C, respectively, to controller 111. Signals 127A-C are indicative of the alcohol content of a cask measured by alcohol vapor sensors 123A-C, respectively.

In another aspect, a battery supplies electrical power to elements of a CIEM subsystem. As depicted in FIG. 1, battery 150 supplies electrical power to controller 111, load cells 120A-C, RFID readers 121A-C, and vapor sensors 123A-C. In some embodiments, battery 150 includes one or more alkaline batteries. Alkaline batteries are advantageous due to their minimal risk of fire. High volume storage facilities employed to store casks of alcohol based beverages often include wood as a building material, and the evaporation of alcohol creates a volatile environment within the facility. Thus, a CIEM system is designed to minimize the risk of fire using low power battery power sources in high fire danger areas.

In some other embodiments, power is provided to CIEM subsystem via a wired connection. In some embodiments, power is supplied to a CIEM subsystem via a wired connection operating in accordance with a Power Over Ethernet (POE) protocol. In one embodiment, power is supplied to a CIEM subsystem via a wired connection from a gateway or another power source. In these embodiments, a battery power source integrated with a CIEM subsystem is optional.

In another further aspect, a CIEM system includes one or more ethanol sensors located within a high volume storage facility employed to store casks of alcohol based beverages. The ethanol sensor is communicatively linked to a communications gateway via a wired or wireless connection. The ethanol sensor generates signals indicative of the volatility of the environment within the high volume storage facility. These signals are communicated to a CIEM tracking server via the communications gateway. In some examples, the CIEM tracking server generates an alert to a user of the CIEM system when the measured volatility exceeds one or more predetermined threshold values. In some examples, a predetermined threshold is set to indicate an unacceptable fire risk. In some other examples, a predetermined threshold is set to indicate possible leakage from a cask in the vicinity of an ethanol sensor.

As depicted in FIG. 1, CIEM subsystem 130 includes ethanol sensor 109 communicatively coupled to gateway 110. Ethanol sensor 109 communicates signal 118 to CIEM tracking server 101 via gateway 109. Signal 118 is indicative of the volatility of the air surrounding ethanol sensor 109 within a high volume storage facility.

In another aspect, each CIEM subsystem is communicatively linked to a communications gateway via a wired or wireless connection. Furthermore, the communications gateway is communicatively linked to a CIEM tracking server by a wired or wireless connection.

As depicted in FIG. 1, CIEM subsystem 130 is communicatively linked to communications gateway 110 by a long range radio frequency based connection. In one example, the wireless communications link operates in accordance with a wireless communications protocol, e.g., a wireless communication link adhering to the IEEE 802.11 protocol.

Measurement data 117 is communicated from controller 111 to gateway 110 over the wireless communications link. Measurement data 117 includes signals indicative of the elements measured by each suite of sensors. For example, measurement data 117 includes the weights measured by load cells 120A-C, the identities measured by RFID readers 121A-C, etc.

In another aspect, sensors of CIEM subsystem 130 are powered down between measurement instances to minimize power consumption by CIEM subsystem 130.

In some embodiments, the load cells of a CIEM subsystem are sampled periodically and the results communicated to CIEM tracking server 101. In one example, the load cells are sampled every hour. In some other examples, the sampling rate is adjusted to change the frequency of measurement in response to detection of a potential leakage event. In one example, if the rate of change of measured weight exceeds a threshold value, it may indicate leakage from a cask. In these examples, CIEM tracking server 101 communicates a command to controller 111 to increase the frequency of weight measurement, e.g., to every 10 minutes, to more closely monitor potential losses.

In another aspect, a CIEM system includes a CIEM tracking server communicatively linked to each of the CIEM subsystems. Each CIEM subsystem is configured to communicate messages to the CIEM tracking server. These messages include the identity and weight of each cask being monitored at each measurement interval. The measured data received by CIEM tracking server is analyzed to perform any number of tasks including, but not limited to providing alerts to a user indicating possible leakage from a specific cask, reporting long term evaporation trends from one or more casks, scheduling repositioning of casks within a long term storage facility, estimating cumulative evaporative losses from a specific cask, etc.

As depicted in FIG. 1, CIEM system 100 includes a CIEM tracking server 101 communicatively linked to CIEM subsystem 130 via communications gateway 110. In some embodiments, the CIEM tracking server 101 is communicatively linked to communications gateway 110 via the Internet 107. However, in general, a CIEM tracking server 101 may be communicatively linked to a communications gateway 110 by any communication link known to those skilled in the art. For example, CIEM tracking server 101 may be communicatively linked to communications gateway 110 over a local area network (LAN), a wireless communications network, or any other suitable communications network. In this manner signals 108 are communicated from communications gateway 110 to CIEM tracking server 101.

Figure 6:
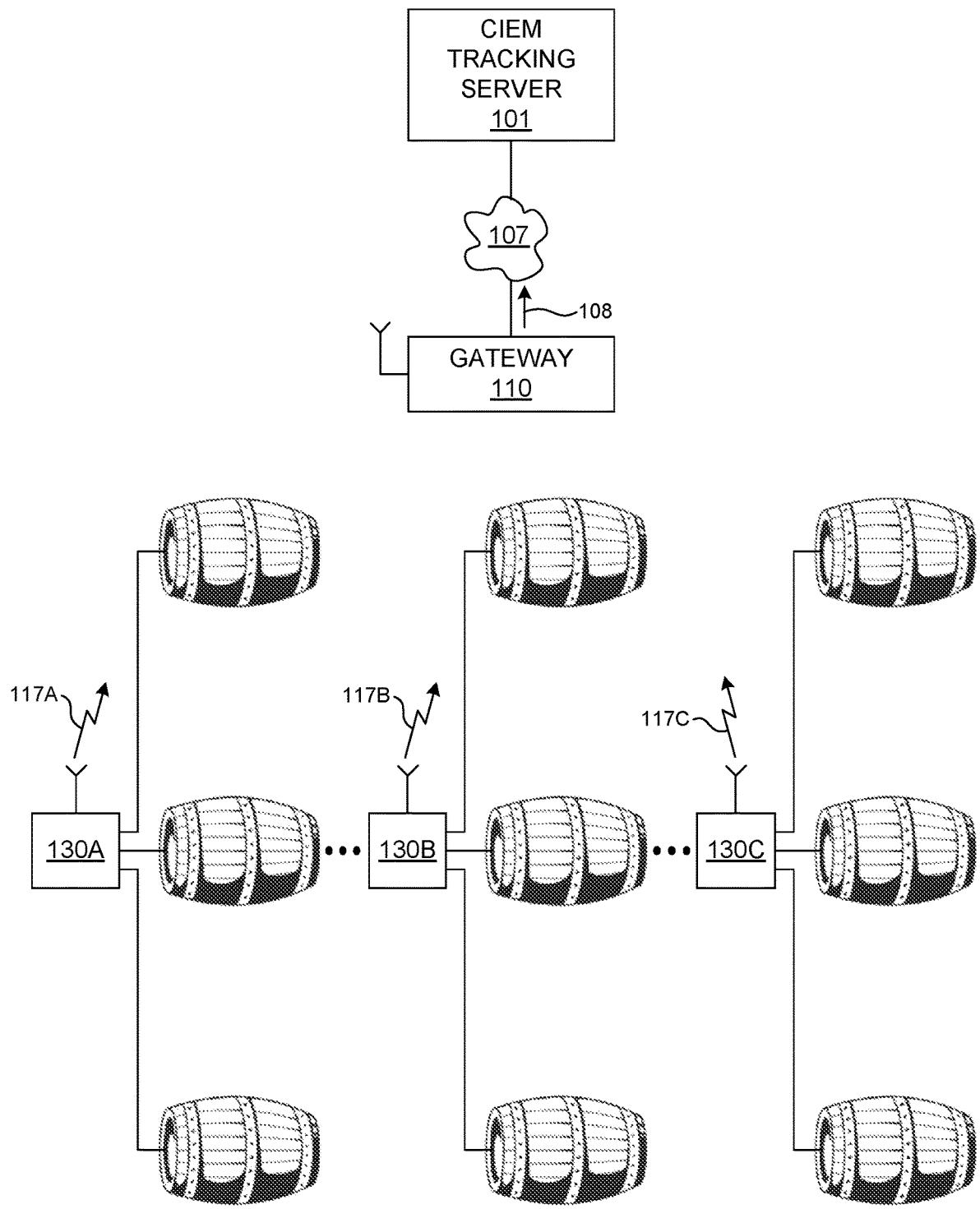
FIG. 6 is a diagram illustrative of three CIEM subsystems, each monitoring three different casks.

Although FIG. 1 depicts CIEM tracking server 101 communicatively linked to one communications gateway, in general, a CIEM tracking server 101 may be communicatively coupled to one or more communications gateways in one or more geographic locations. In this manner, a CIEM tracking server 101 is able to monitor casks located over a large area, e.g., within a large storage facility, or geographic region (e.g., nationwide network of storage facilities, global network of storage facilities, etc.). In one example, FIG. 6 depicts an illustration of three CIEM subsystems 130A-C, each monitoring three different casks. As depicted in FIG. 6, CIEM subsystems 130A-C communicate measurement data 117A-C, respectively, to gateway 110.

As depicted in FIG. 1, CIEM tracking server 101 includes a processor 102 and an amount of memory 104. Processor 102 and memory 104 may communicate over bus 103. Memory 104 includes an amount of memory that stores a database program executable by processor 102. Exemplary, commercially available database programs include Oracle®, Microsoft SQL Server®, IBM DB2®, etc. Memory 104 also includes an amount of memory that stores a cask storage database of stored casks, their locations, their weight, alcohol content, etc., searchable by the database program executed by processor 102. In addition, CIEM tracking server 101 includes communication interface 105 to communicatively link CIEM tracking server 101 to communications gateway 110.

By way of non-limiting example, CIEM tracking server 101 is operable to communicate with an external computing system (not shown) over a communications link. In one example, an external computing system requests a cask storage record 106 associated with a particular cask, and in response, CIEM tracking server 101 communicates the cask storage record 106 to the external computing system.

In some embodiments, CIEM tracking server 101 is a cloud-based computing system, and cask storage data and analyses as described herein are performed on a cloud-based network of computing devices.

In one aspect, a CIEM tracking server identifies excessive short term weight losses, e.g., leaks, arising anywhere in the storage facility.

In one example, CIEM tracking server 101 determines the difference in weight between the current measurement and the previous measurement. In another example, CIEM tracking server 101 determines the difference in weight between the current measurement and an average of a number of prior measurements. If the difference exceeds a predetermined threshold value, an alert is generated by the CIEM tracking server and communicated to a user of the CIEM system, e.g., email, telephonic communication, SMS message, etc.

Figure 5:
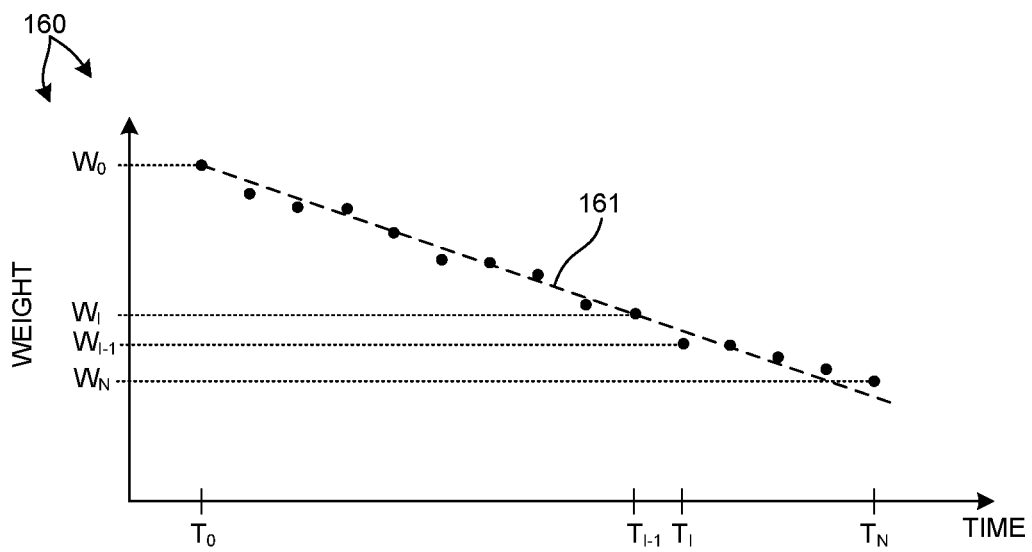
FIG. 5 is a plot illustrative of a sequence of weight measurements performed by a load cell over time.

FIG. 5 depicts a plot 160 including a sequence of weight measurements performed by a load cell, e.g., load cell 120, over time. As depicted in FIG. 5, a first measurement is performed at time, T0, after positioning a cask on a support frame. Subsequent measurements are periodically performed with a fixed interval between measurements. In one example, CIEM tracking server 101 determines the difference between the weight measured at current time, $T_i$, and the previous weight measurement at time, $T_{i-1}$. In some of these examples, the difference is normalized by the initial measured weight, $W_0$. If the difference exceeds a predetermined threshold value, CIEM tracking server 101 communicates an alert to a user of the CIEM system. The alert includes an indication that there may be leakage from a particular cask and the location of that particular cask in the storage facility. In addition, in some examples, CIEM tracking server 101 communicates a command to controller 111. In response, controller 111 changes the time interval between measurements to a reduced value. In this manner, CIEM tracking server 101 is able to closely monitor weight loss that may be occurring due to leakage, and enables a user to rapidly repair a leaking cask before excessive losses occur.

In another aspect, a CIEM tracking server identifies weight loss, e.g., evaporative losses arising anywhere in the storage facility. In addition, the evaporation tracking server identifies weight loss trends that enable data-driven scheduling of cask rotation within the storage facility, bottling, etc.

In one example, CIEM tracking server 101 determines the difference between the weight measured at current time, $T_i$, and the initial weight measurement at time, $T_0$. In some of these examples, the difference is normalized by the initial measured weight, $W_0$. The difference in weight is indicative of the cumulative weight loss during the period of time between $T_0$ and $T_i$.

In another example, CIEM tracking server 101 determines an average weight loss over time. In some examples, CIEM tracking server 101 determines an average weight loss, depicted as line 161 in FIG. 5, that minimizes a difference between the weight estimated by line 161 and the measured weights over time, based on a linear least squares analysis. In general, any suitable mathematical technique may be employed to estimate weight loss over time based on the actual weight measurements.

In some examples, CIEM tracking server 101 determines the total weight loss measured while the cask is maintained in different locations in a storage facility. For example, FIG. 5 depicts the difference between the weight measured at an initial time, TO, and the weight at time, TN. In one example, the cask is moved to a different location in the storage facility, or is removed and replaced onto the same support frame after time, TN, but before the next measurement sample. When the cask is repositioned, the fraction of the weight of the cask supported by the load cell may change. Thus, upon placement of the cask on the support frame, the CIEM tracking server 101 tabulates a new cumulative weight loss referenced to the most recent initial weight measurement. However, in addition, CIEM tracking server 101 tracks the total weight loss associated with the cask as the sum of the cumulative weight losses associated with each placement of the cask onto a support frame.

In a further aspect, CIEM tracking server 101 estimates the ABV of the contents of a particular cask by comparing the cumulative weight loss with a known, reference relationship between cumulative weight loss and ABV associated with the particular liquor stored in the cask. The estimated ABV can be compared to the results of a manual measurement of the ABV at any time.

In another further aspect, CIEM tracking server 101 determines the difference between the cumulative weight loss associated with a particular cask and an average value of cumulative weight loss of multiple casks located in a storage facility. In one example, if the difference exceeds a predetermined threshold value, an alert is communicated to a user indicating that the cask should be moved to a different location in the storage facility where the rate of evaporation is less, e.g., a location in the storage facility where the average temperature is lower.

It is known that the rate of evaporation on the top shelf of a storage rack in a storage facility is higher than the rate of evaporation on a lower shelf. Because both the weight loss and location of a particular cask are monitored by CIEM tracking server 101, a rotation schedule can be devised to ensure even maturation of all casks.

Figure 7:
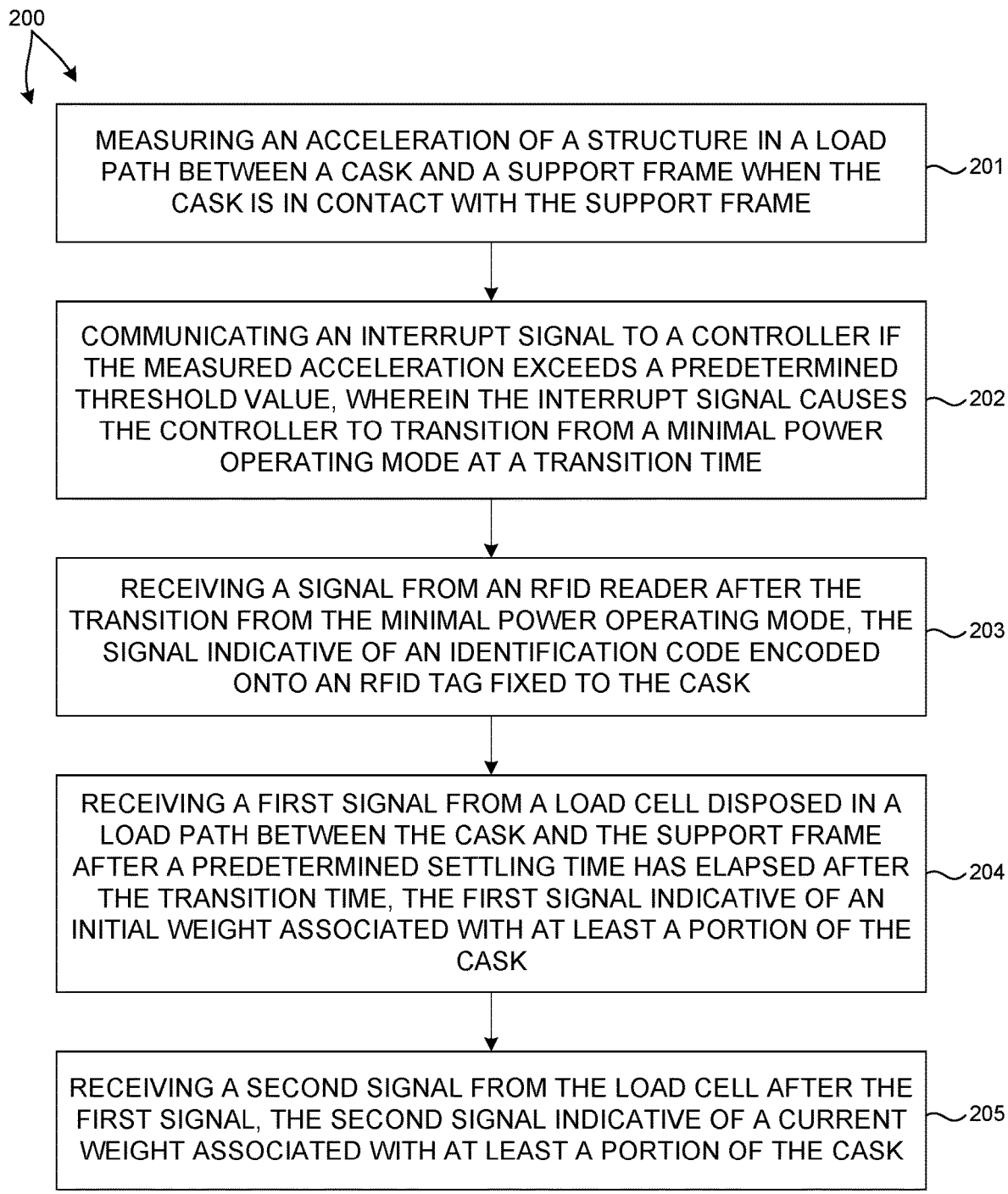
FIG. 7 is a flowchart illustrative of a method 200 of identifying and monitoring evaporation from casks storing high value liquor in at least one aspect.

FIG. 7 illustrates a method 200 for identifying and accurately monitoring evaporation from casks storing high value liquor in at least one aspect. Method 200 is suitable for implementation by a Cask Identification and Evaporation Monitoring (CIEM) system illustrated in FIG. 1 of the present invention. In one aspect, it is recognized that data processing blocks of method 200 may be carried out via a pre-programmed algorithm executed by one or more processors of the CIEM system 100, or any other general purpose computing system. It is recognized herein that the particular structural aspects of CIEM system 100 do not represent limitations and should be interpreted as illustrative only.

In block 201, an acceleration of a structure in a load path between a cask and a support frame is measured when the cask is in contact with the support frame.

In block 202, an interrupt signal is communicated to a controller if the measured acceleration exceeds a predetermined threshold value. The interrupt signal causes the controller to transition from a minimal power operating mode at a transition time.

In block 203, a signal from an RFID reader is received after the transition from the minimal power operating mode. The signal is indicative of an identification code encoded onto an RFID tag fixed to the cask.

In block 204, a first signal is received from a load cell disposed in a load path between the cask and the support frame after a predetermined settling time has elapsed after the transition time. The first signal is indicative of an initial weight associated with at least a portion of the cask.

In block 205, a second signal is received from the load cell after the first signal. The second signal is indicative of a current weight associated with at least a portion of the cask.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. For example, the teachings of this patent document reference the monitoring of liquor stored in a cask. However, in general, the teachings of this patent document apply to the monitoring of any alcohol based beverage stored in any suitable container, e.g., barrel, tank, etc. Accordingly, various modifications, adaptations, and combinations of various features of the described embodiments can be practiced without departing from the scope of the invention as set forth in the claims.

What is claimed is:

1. A Cask Identification and Evaporation Monitoring (CIEM) system comprising:
    one or more CIEM subsystems, each of the one or more CIEM subsystems comprising:
        a load cell disposed in a load path between a cask and a support frame;
        a Radio Frequency Identification (RFID) reader disposed in close proximity to the cask; and
        a local controller communicatively coupled to the load cell and the RFID reader, the local controller configured to:
            receive a signal from the load cell indicative of a current weight associated with at least a portion of the cask;
            receive a signal from the RFID reader, the signal indicative of an identification code encoded onto an RFID tag fixed to the cask; and
    a CIEM tracking server communicatively coupled to the local controller, the CIEM tracking server configured to:
        receive the signal indicative of the current weight associated with at least a portion of the cask;
        receive the signal indicative of the identification code;
        determine a first cumulative amount of weight loss from the cask based on a difference between the current weight and a weight of the cask measured by the load cell at an earlier instance; and
        determine a location of the cask in a storage facility based on the identification code.

2. The CIEM system of claim 1, wherein the each of the one or more CIEM subsystems further comprising:
    an accelerometer disposed on a structure that moves with the cask while the cask is in contact with the support frame.

3. The CIEM system of claim 1, wherein the each of the one or more CIEM subsystems further comprising:
    an alcohol vapor sensor disposed in a bung that closes a fill hole of the cask.

4. The CIEM system of claim 1, wherein the each of the one or more CIEM subsystems further comprising:
    a battery electrically coupled to the load cell and the RFID reader, wherein the battery provides electrical power to the load cell and RFID reader.

5. The CIEM system of claim 1, wherein the CIEM tracking server is further configured to:
    determine an incremental weight loss from the cask based on a difference between the current weight and a weight of the cask measured by the load cell at the previous sampling instance; and
    communicate an alert to a user of the CIEM system if the difference exceeds a predetermined threshold value.

6. The CIEM system of claim 5, wherein the CIEM tracking server is further configured to:
    communicate a control command to the local controller if the difference exceeds the predetermined threshold value, wherein the control command causes the local controller to reduce a time interval between measurements of the cask by the load cell.

7. The CIEM system of claim 1, wherein the local controller powers down the load cell and the RFID reader between measurements.

8. A method comprising:
    measuring an acceleration of a structure in a load path between a cask and a support frame when the cask is in contact with the support frame;
    communicating an interrupt signal to a controller if the measured acceleration exceeds a predetermined threshold value, wherein the interrupt signal causes the controller to transition from a minimal power operating mode at a transition time;
    receiving a signal from an RFID reader after the transition from the minimal power operating mode, the signal indicative of an identification code encoded onto an RFID tag fixed to the cask;
    receiving a first signal from a load cell disposed in a load path between the cask and the support frame after a predetermined settling time has elapsed after the transition time, the first signal indicative of an initial weight associated with at least a portion of the cask; and
    receiving a second signal from the load cell after the first signal, the second signal indicative of a current weight associated with at least a portion of the cask.

9. The method of claim 8, wherein the measuring of the acceleration involves an accelerometer, wherein the accelerometer is a piezoelectric based sensor, and wherein the interrupt signal is generated by the piezoelectric based sensor.

10. The method of claim 9, further comprising:
    determining a first cumulative amount of weight loss from the cask based on a difference between the current weight and the initial weight of the cask.

11. The method of claim 8, further comprising:
    determining a location of the cask in a storage facility based on the identification code.

12. The method of claim 8, further comprising:
    receiving a signal from an alcohol vapor sensor disposed in a bung that closes a fill hole of the cask, the signal indicative of an alcohol content of a liquor stored in the cask.

13. The method of claim 8, further comprising:
    providing an amount of electrical power to the load cell and the RFID reader from a battery.

14. The method of claim 8, further comprising:
    determining an incremental weight loss from the cask based on a difference between the current weight and a weight of the cask measured by the load cell at a previous sampling instance; and
    communicating an alert message to a user of a Cask Identification and Evaporation Monitoring (CIEM) system if the difference exceeds a predetermined threshold value.

15. The method of claim 14, further comprising:
reducing a time interval between measurements of the cask by the load cell if the difference exceeds the predetermined threshold value.

16. The method of claim 8, further comprising:
powering down the load cell and the RFID reader between measurements.

17. A Cask Identification and Evaporation Monitoring (CIEM) system comprising:
one or more CIEM subsystems, each of the one or more CIEM subsystems comprising:
a load cell disposed in a load path between a cask and a support frame;
a Radio Frequency Identification (RFID) reader disposed in close proximity to the cask; and
a first non-transitory, computer readable medium comprising instructions that when executed by one or more processors, cause the one or more processors to:
receive a signal from the load cell indicative of a current weight associated with at least a portion of the cask;
receive a signal from the RFID reader, the signal indicative of an identification code encoded onto an RFID tag fixed to the cask; and
a second non-transitory, computer readable medium comprising instructions that when executed by one or more processors, cause the one or more processors to:
receive the signal indicative of the current weight associated with at least a portion of the cask;
receive the signal indicative of the identification code;
determine a first cumulative amount of weight loss from the cask based on a difference between the current weight and a weight of the cask measured by the load cell at an earlier instance; and
determine a location of the cask in a storage facility based on the identification code.

18. The CIEM system of claim 17, wherein the each of the one or more CIEM subsystems further comprising:
a battery electrically coupled to the load cell and the RFID reader, wherein the battery provides electrical power to the load cell and RFID reader.

19. The CIEM system of claim 17, wherein the second non-transitory, computer readable medium comprising instructions that when executed by the one or more processors, cause the one or more processors to:
determine an incremental weight loss from the cask based on a difference between the current weight and a weight of the cask measured by the load cell at the previous sampling instance; and
communicate an alert to a user of the CIEM system if the difference exceeds a predetermined threshold value.

20. The CIEM system of claim 17, wherein the second non-transitory, computer readable medium comprising instructions that when executed by the one or more processors, cause the one or more processors to:
reduce a time interval between measurements of the cask by the load cell if the difference exceeds the predetermined threshold value.

* * * * *